United States Patent [19]

Hawksworth

[11] 4,050,320
[45] Sept. 27, 1977

[54] TRANSMISSION MECHANISMS

[75] Inventor: Frederick James Hawksworth, Crewe, England

[73] Assignee: Rolls-Royce Motors Limited, Crewe, England

[21] Appl. No.: 549,748

[22] Filed: Feb. 13, 1975

[30] Foreign Application Priority Data

Feb. 20, 1974 United Kingdom ............... 7654/74

[51] Int. Cl.² ........................................... F16H 27/00
[52] U.S. Cl. ...................................... 74/112; 192/16
[58] Field of Search ............... 192/16, 48.91; 74/116, 74/117, 112, 125.5

[56] References Cited

U.S. PATENT DOCUMENTS

| 1,215,614 | 2/1917 | Brown | 74/116 |
|---|---|---|---|
| 2,592,237 | 4/1952 | Bradley | 74/571 |
| 3,039,133 | 6/1962 | Milton et al. | 192/16 |
| 3,262,532 | 7/1966 | Phelps | 192/16 |

Primary Examiner—Samuel Scott
Assistant Examiner—Wesley S. Ratliff, Jr.
Attorney, Agent, or Firm—Cushman, Darby & Cushman

[57] ABSTRACT

A windscreen wiper transmission mechanism comprises a driving wheel with a shaft eccentrically positioned on the wheel. A connecting link for connecting the mechanism to a member for driving a corresponding wiper blade, an eccentric bearing and a rotor are mounted on the shaft. A roller, complementary apertures in the eccentric bearing and rotor and a complementary recess in the link enable the eccentric bearing and link to be connected positively together so that the link can be positively driven from a position corresponding to a park position to a position corresponding to a wipe position of the wiper blade and the rotor and eccentric bearing to be positively connected together to allow repeated oscillation of the link in the wipe position.

6 Claims, 9 Drawing Figures

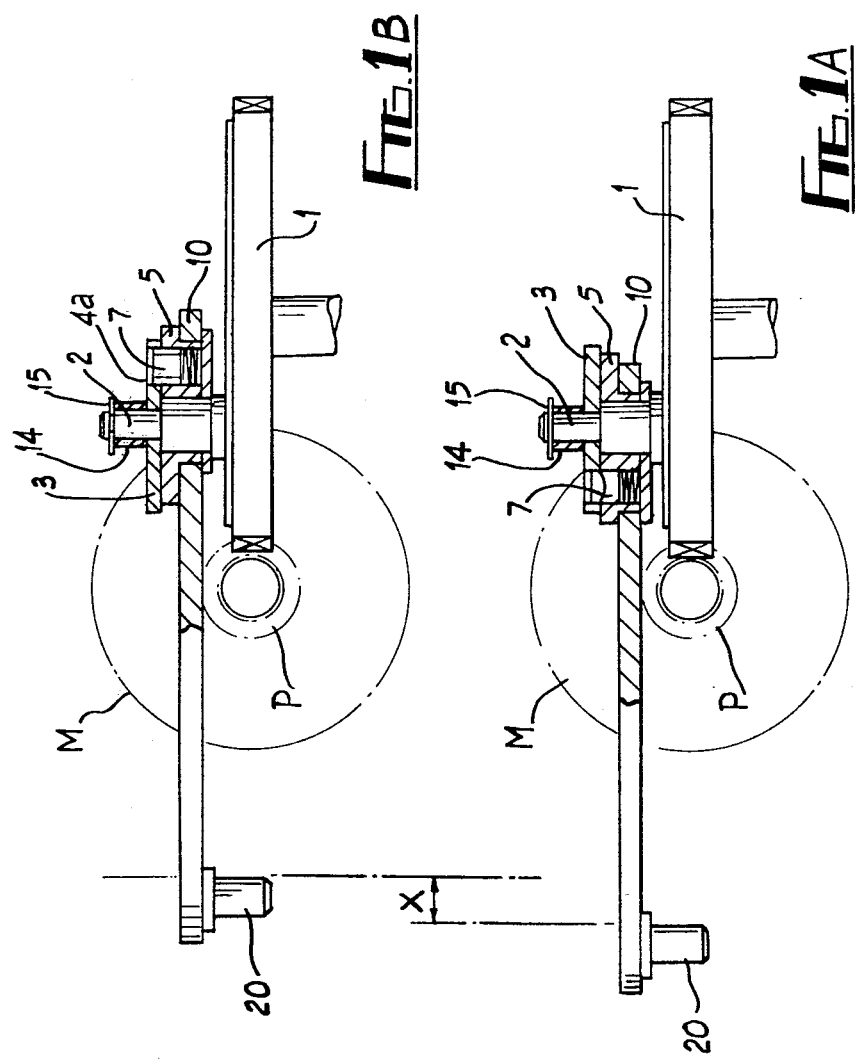

TRANSMISSION MECHANISMS

The present invention relates to a transmission mechanism particularly, but not exclusively, for a vehicle windscreen wiper mechanism in which a continuous rotational movement is converted into a reciprocating rotational movement. Where the wiper blades are to be displaced to a parked position at the lower edge or off the windscreen, the mechanism must also provide for an elongated cycle at the end of and beginning of each wiping period.

In an existing arrangement of windscreen wiper mechanism, the existing windscreen wiper motor is an integral motor and gear box, transmitting a reciprocating motion through a crank pin and connecting link to the wiper wheelboxes, and hence to the wiper blades on the screen. A cable rack may be interposed between the connecting link and the wheelboxes.

The automatic parking of the wiper blades is achieved, by coupling the connecting link to the motor output gear crank pin, via an eccentric bearing.

When the wipers are switched on, the eccentric bearing is frictionally rotated to a predetermined rotational position, by a wave washer spring loaded onto three friction pads, and driven by the motor output gear crank pin. This displaces the reciprocating motion of the connecting link, to displace the wiper blades to their normal wipe position on the screen. The eccentric bearing is retained in its predetermined or wipe position by a spring loaded pawl, while the wave washer continues to rotate over the friction pads in parallel with the driving members of the motor output gear, to provide the receprocating motion for the wiper blades. When the windscreen wipers are switched off or to the park position, the wiper motor reverses direction, and the eccentric bearing is unlatched from the spring loaded pawl, and rotated mechanically by a driving dog, to displace the reciprocating motion of the connecting link to its parking stroke, which puts it in contact with a limit switch, to stop the motor when the wiper blades reach the predetermined park position. This method of automatic parking is not completely reliable, even under ideal screen conditions the first wipe cycle only traverses three quarters of the normal wiping arc, because the wave washer requires a complete revolution of the motor output gear to frictionally rotate the eccentric bearing through 180°. Under adverse screen conditions, the frictional loading on the wave washer can not always overcome load variations in the system, resulting in the wiper blades operating numerous cycles on the parking stroke, before displacement to their normal wiping arc on the screen, consequently a dirty streak and an unwiped area of the windscreen is left in the driver's vision. The short first wipe cycle also introduces this undesirable feature with the intermittent wipe cycle, until the delayed second wipe cycle is completed.

According to the present invention, there is provided a transmission mechanism comprising a driving member, a rotor member eccentrically mounted with respect to the driving member and adapted to rotate therewith, a further member eccentrically mounted with respect to the rotor member an output member and means providing a positive mechanical connection between the rotor and further members in one position of the output member and between the further and output members in another position of the output member.

In order that the invention may be more clearly understood, one embodiment of the invention will now be described by way of example with reference to the accompanying drawings, in which:-

FIG. 1a shows a side sectional elevation of the mechanism of FIG. 1 for the mechanism in the wiper parked position.

FIG. 1b shows a side sectional elevation of the mechanism of FIG. 1 for the mechanism in the normal wipe position.

Figure 1:
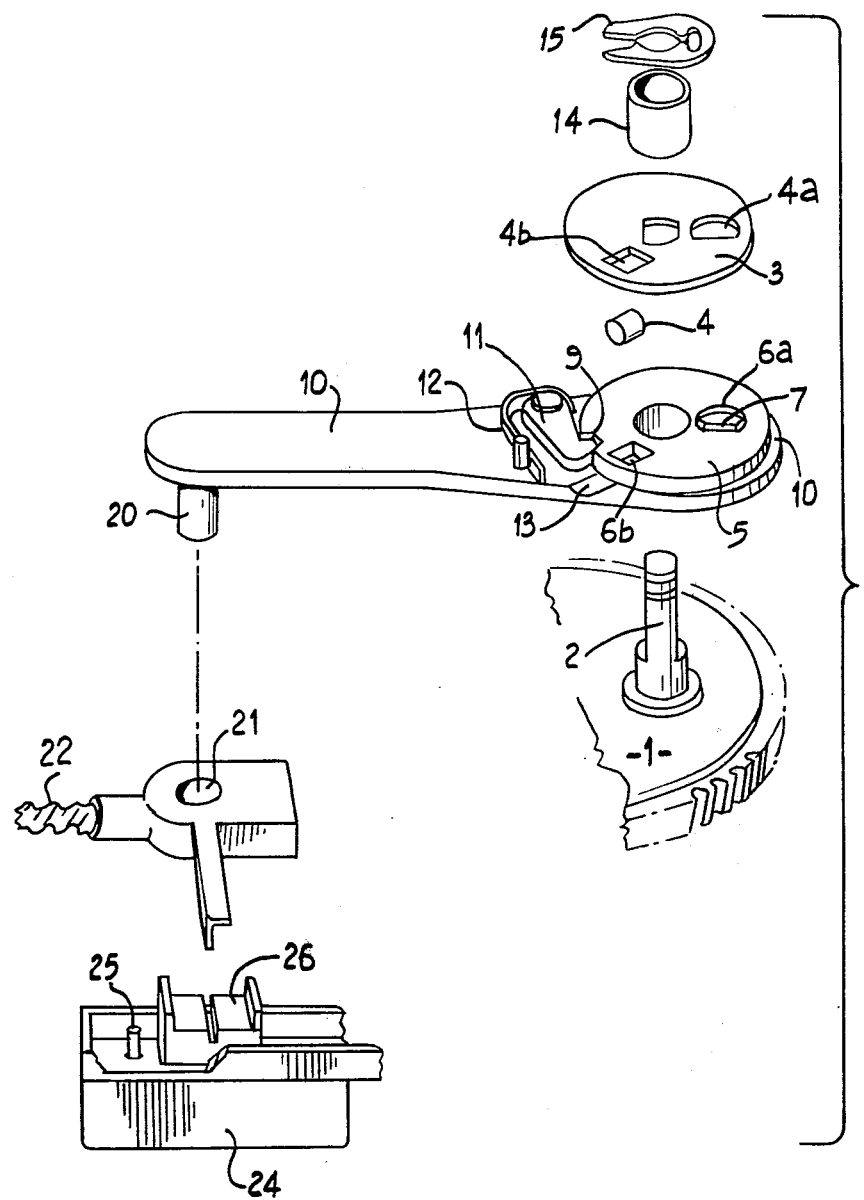
FIG. 1 shows an exploded view of one form of windscreen wiper transmission mechanism.
Figure 2:
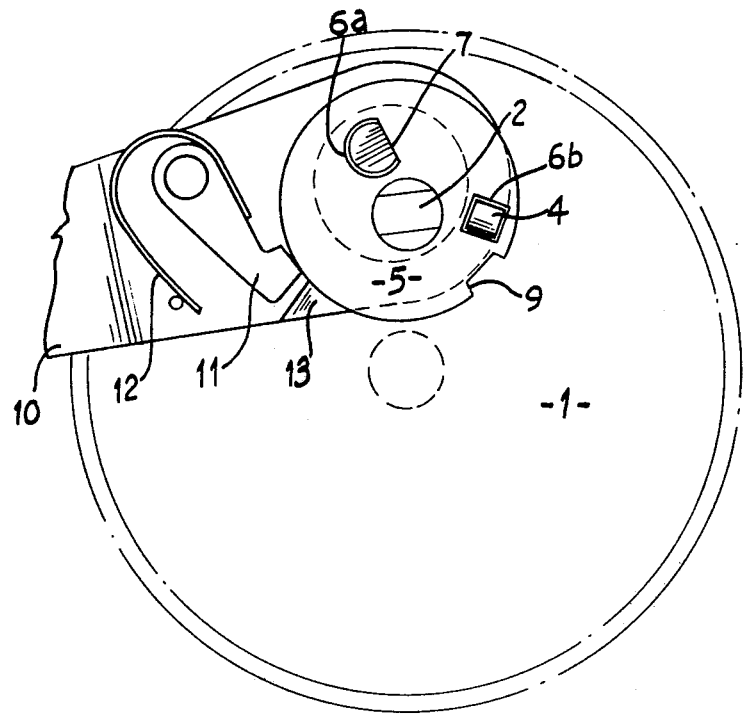
Figure 2A:
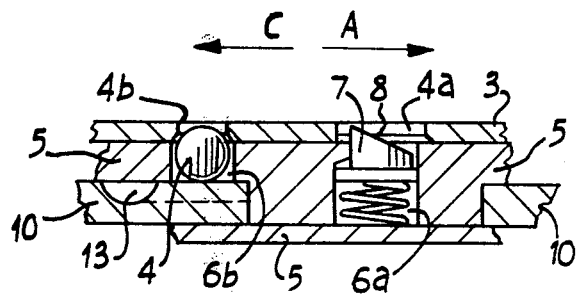

FIGS. 2 and 2a respectively show a plan view of and section through a part of the embodiment of FIG. 1 for the mechanism moving from the parked position to a wipe position of the wiper.

Figure 3:
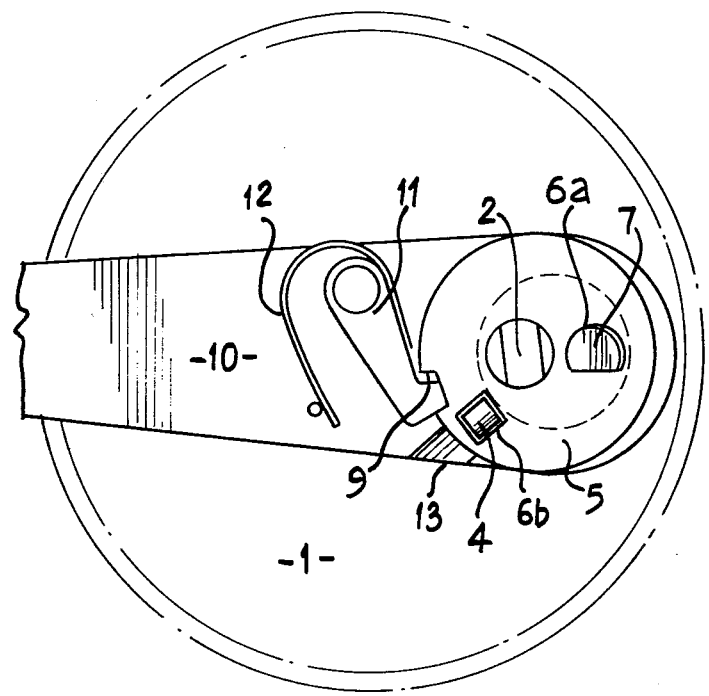
Figure 3A:
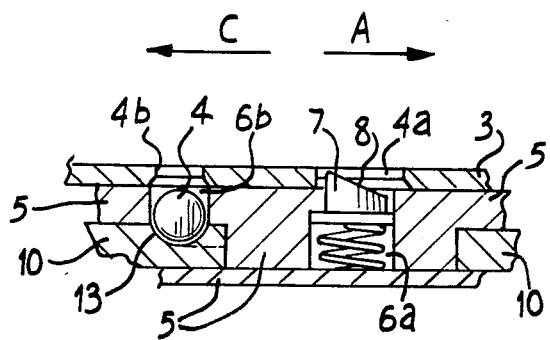
Figure 4:
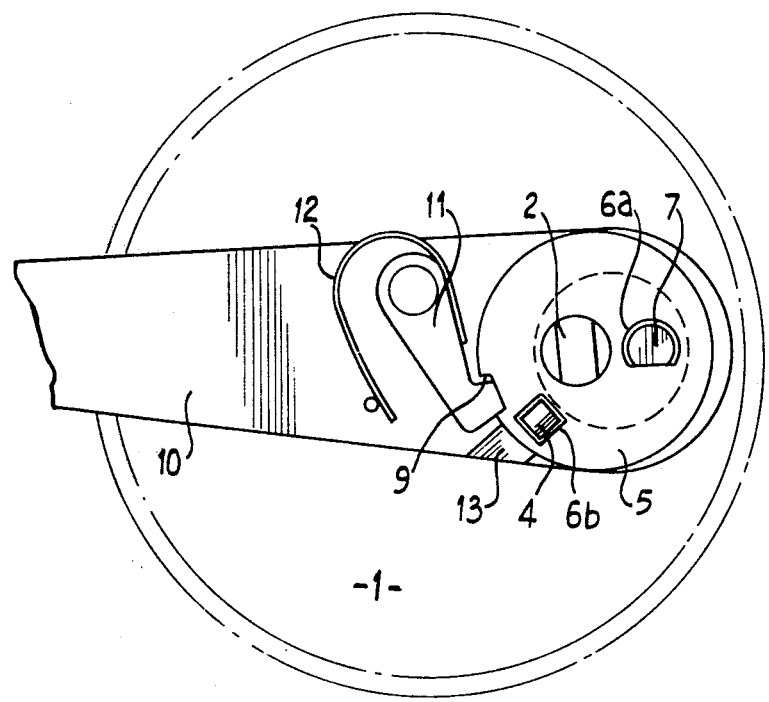
Figure 4A:
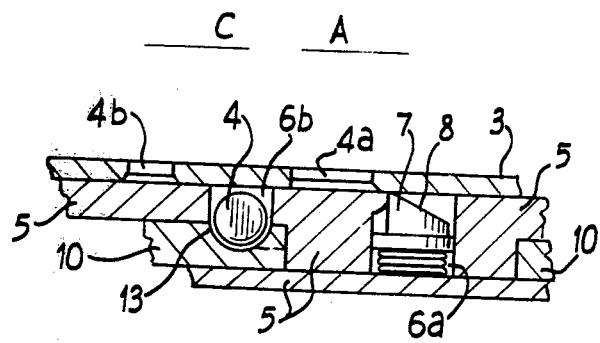

FIGS. 3 and 3a respectively show a plan view of and section through a part of the embodiment of FIG. 1 for the wiper moving from the parked into an extreme wiping position and FIGS. 4 and 4a respectively show a plan view of and section through a part of the embodiment of FIG. 1 for the wiper in a wiping position.

Referring to the drawings, a windscreen wiper motor indicated diagrammatically by the circle M drives, through a pinion P, an output gear in the form of a toothed wheel 1 made of synthetic plastics material. A crank pin 2 is mounted eccentrically on the wheel 1 and extends normal to the plane thereof. A rotor 3 is non-rotatably mounted on the pin 2 and two apertures 4a and 4b of substantially square cross-section are disposed around and extend through the rotor.

The rotor 3 lies over an eccentric bearing 5 which is eccentrically and rotatably mounted on the pin 2. This eccentric bearing 5 also has two apertures 6a and 6b, disposed around and extending through the eccentric bearing 5. In one of the apertures 6a is mounted a spring loaded latch 7 which has a sloping face 8, and in the other aperture 6b is disposed a roller 4. The bearing 5 also has a peripheral recess 9 for a purpose which will be described later. A retaining washer 14 and clip 15 are provided.

The eccentric bearing 5 is rotatably connected to a connecting link 10 so that the link 10 is rotatable with respect to the pin 2. This link 10 has a projection 20 which is received by an aperture 21 of an end connecting member of a rack 22 through which the pinions of the windscreen wipers are reciprocated. A pawl 11 loaded by a spring 12 is provided and this pawl is intended to co-act with the peripheral recess 9 in the eccentric bearing 5 in order to lock the bearing 5 and link 10 together. The link 10 defines, in its upper surface, a groove 13 which is intended partially to receive the roller 4 unlocking the bearings 5 from the rotor 3.

The operation of the above described arrangement is as follows. To simplify the various drawings, the rotor 3 has not been shown in FIGS. 2, 3 and 4 and that part of the mechanism below the link 10 has not been shown in FIGS. 2a, 3a and 4a. In these latter figures, the clockwise and anti-clockwise directions have been indicated by respective arrows C and A. In the parked position of the mechanism and wipers, the connecting link 10, which reciprocates in guides, is displaced to its most extreme position relative to the wheel 1 and the corresponding wiper element or blade is displaced to the lower edge of, or completely from, the windscreen surface (see particularly FIG. 1a). To switch the windscreen wiper motor off in this position a limit switch indicated diagrammatically at 24 is provided. The switch comprises a switch member 25 disposed in the path of an actuator member 26 connected to the end connecting member of the rack 22. This switch member 25 is operated by the member 26 under the action of the connecting link 10 when it reaches its extreme position (FIG. 1a). The rotor 3 and eccentric bearing 5 are locked together through the roller 4. When the wiper mechanism is again actuated, the wheel 1 rotates clockwise, and the rotor 3 is driven clockwise through the crank pin 2 (FIGS. 2 and 2a). This rotor 3 in turn positively drives the bearing 5 clockwise through the roller 4 until the roller 4 is aligned with and settles in the groove 13 in the connecting link 10. Simultaneously, the spring loaded pawl 11 engages in the peripheral recess 9 in the eccentric bearing 5 effectively locking the eccentric bearing 5 and connecting link 10 together (FIGS. 3 and 3a). At the same time, the roller has dropped completely from the aperture 4b so that the rotor 3 is no longer locked relative to the bearing 5 and can continue to rotate with the wheel 1 which through the crank pin 2 provides the reciprocating motion for the link 10 (FIG. 4). The sloped face 8 of the latch 7 enables the rotor 3 which is connected to crank pin 2 to ride over the latch. The effect of displacing the eccentric bearing 5, through which the connecting link 10 is driven relative to the connecting link 10 is to displace the link a distance 'x' (see FIGS. 1a and 1b) from the parked to the normal wipe position. Rotation of the wheel 1 then produces a normal reciprocating wiping action of the link 10, as this link 10 is then out of range of the switch member 25 of the limit switch 24 (FIGS. 1b and 4 and 4a).

When the wiper mechanism is turned to the off position, the direction of rotation of the wiper motor is reversed as a result of which the wheel 1 is driven anticlockwise. The rotor 3 is rotated anti-clockwise, through the pin 2 relative to the bearing 5 until the aperture 4a is over the latch 7 (see FIG. 3). The latch 7 is pushed into aperture 4a by the spring and rotor 3 and bearing 5 are again locked together. Further rotation of the rotor 3 and bearing 5 disengages the spring loaded pawl 11 thus unlocking the bearing 5 from the connecting link 10 and at the same time recovering the roller 4 from the groove 13. The wheel 1 continues to rotate and positively drives the rotor 3 and bearing 5 to displace the link 10 to the extreme position to contact, through the actuator member 26, the switch member 25 of the limit switch 24 in the parked position, and switch the motor M off.

It will be appreciated that the above embodiment has been described by way of example only and that many variations are possible without departing from the scope of the invention.

What is claimed is:

1. A transmission mechanism comprising a reversible motor, a driving member rotatably driven from the motor, a rotor member non-rotatable with respect to and eccentrically mounted on the driving member and arranged to rotate therewith, a further member eccentrically mounted with respect to and selectively rotatable with respect to the rotor member, and output member operatively supported by and selectively rotatable relative to said further member, a first means, automatically operable when said motor is driving in a reverse direction of rotation and said output member is in one position, to provide a positive mechanical connection between the rotor member and the further member, said first means being biased to its operative position, and a second means automatically operable, when said motor is driving in a forward direction of rotation and said output member is in another position, to provide a positive mechanical connection between the further member and the output member, said second means being also employed firstly, when the direction of rotation of the motor is changed from reverse to forward rotation, so as to enable the rotor member to carry the further member to its correct position for the second means of positive mechanical connection to take place, and secondly, when the direction of the motor is changed from forward to reverse rotation, so as to hold the further member to the output member until such time as the rotor member is moved to the position where it can be engaged by the first means of positive mechanical connection.

2. A transmission mechanism as claimed in claim 1, including a pin fixed eccentrically on the driving member and on which said rotor member is non-rotatably mounted.

3. A transmission mechanism as claimed in claim 1, in which the second means providing a positive mechanical connection comprises a roller housed in an aperture extending through the further member which seats in a recess in the output member in one relative position of the further and output members and extends into an aperture in the rotor member in another relative position of the rotor and further members.

4. A transmission mechanism as claimed in claim 3, in which the first means providing a positive mechanical connection comprises a spring loaded latch.

5. A transmission mechanism as claimed in claim 3, in which the further member comprises a peripheral recess with which a pawl fixed to the output member co-operates, when said further an output members are in the said one relative position to, provide a further mechanical connection between the further and output members when the motor is driving in the forward direction of rotation.

6. A transmission mechanism as claimed in claim 5, in which said pawl is spring loaded.

* * * * *